United States Patent [19]

Saleeby

[11] Patent Number: 4,982,186

[45] Date of Patent: Jan. 1, 1991

[54] PULSE TRAIN RELAY

[75] Inventor: Robert W. Saleeby, London, England

[73] Assignee: Devotec S.A., Luxembourg

[21] Appl. No.: 318,401

[22] Filed: Mar. 2, 1989

[30] Foreign Application Priority Data

Mar. 2, 1988 [FR] France ............................ 88 02601

[51] Int. Cl.$^5$ ............................................ H04B 7/00
[52] U.S. Cl. ............................... 340/825.610; 375/4;
455/7; 328/108; 340/825.630
[58] Field of Search ................... 340/825.61, 825.57,
340/825.63, 825.07; 455/18, 8, 9, 10, 7, 24;
375/3, 4, 3.1; 328/108, 112, 119; 307/234;
370/97; 371/62; 364/486

[56] References Cited

U.S. PATENT DOCUMENTS

| | | | |
|---|---|---|---|
| 3,646,441 | 2/1972 | Magnuski | 375/3 |
| 3,988,688 | 10/1976 | Wu | 340/825.63 |
| 4,680,772 | 7/1987 | Kage | 375/4 |
| 4,763,254 | 8/1988 | Mori et al. | 340/825.61 |
| 4,789,993 | 12/1988 | Ryu | 455/24 |
| 4,815,101 | 3/1989 | Bargeton et al. | 375/3.1 |
| 4,873,518 | 10/1989 | Mehnert | 340/825.63 |
| 4,881,041 | 11/1989 | Kawanabe et al. | 328/112 |
| 4,908,771 | 5/1990 | Piot | 328/112 |

OTHER PUBLICATIONS

Patent Abstracts of Japan, vol. 10, No. 248 (E-431) (2304), Aug. 26, 1986.

Primary Examiner—Donald J. Yusko
Assistant Examiner—Dervis Magistre
Attorney, Agent, or Firm—Sughrue, Mion, Zinn, Macpeak & Seas

[57] ABSTRACT

A pulse train relay for relaying pulses of duration not exceeding a maximum value (141), the relay being characterized by the fact that it comprises a receiver (1) having an input (2) suitable for picking up the pulses of a train, and an output (3) suitable for delivering a signal as a function of each picked-up pulse, a transmitter (4) having a transmission-feeding first input (5), a transmission-controlling second input (6), and a transmission output (7), a first circuit (8) for connecting the output of the receiver to the transmission-feeding input of the transmitter, and a second circuit (9) suitable for delivering a control pulse (143) starting on reception of a pulse by the receiver and continuing for a duration (144) which is not less than the maximum duration of the pulses in the train, the second circuit connecting the output of the receiver to the transmission-controlling input of the transmitter. The relay is applicable for relaying pulse trains from relay-to-relay without interference from interference impulses.

6 Claims, 1 Drawing Sheet

PULSE TRAIN RELAY

The present invention relates to pulse train relays, i.e. systems for relaying information relay-by-relay and applicable in numerous fields, e.g. for signalling the proximity of travelling vehicles, in particular for preventing chain collisions, for fixed surveillance of buildings, for relaying remote control instructions, e.g. for street lighting, air conditioning, centralized control or traffic assistance, e.g. for public transport vehicles, e.g. for monitoring the passage thereof, or for setting traffic lights, etc. . . . .

BACKGROUND OF THE INVENTION

One such prior art relay is described in U.S. Pat. No. 4,455,650. The device described in said document comprises a receiver which is normally in service, a transmitter suitable for transmitting a pulse throughout the duration of a pulse received by the receiver, and timed switching means for switching off the receiver for a period of time which is longer than the duration of each pulse.

The information relay system comprises a relay-by-relay series of devices of the type described above, each comprising a transmitter and a receiver tuned to the same carrier frequency, together with means for preventing the receiver from receiving as soon as the transmitter is switched on. Each device can thus receive information coming from another device and can relay this information towards a further device which has not received it.

This device has the undoubted advantage, in particular, of preventing interference between the various relay systems, thereby enabling an entire series of information pulses to be relayed without portions thereof being omitted.

However, under certain circumstances, the use of such a device can be disturbed, e.g. by interference pulses if they are of duration greater than the value of the time constant during which the receiver is switched off. If the receiver does receive a pulse of duration longer than said time constant, then when the time constant has elapsed, the receiver is switched back on and perceives the remainder of the interference pulse as a pulse in a train to be relayed, and this continues until said interference pulse stops being transmitted. As a result the associated receiver outputs a series of secondary pulses corresponding to the continuous interference pulse being split up into a plurality of pulses. It goes without saying that in a complex relay system comprising a plurality of devices constituting a whole, transmitting such secondary pulses in response to interference pulses can completely disturb the information relay system as a whole since the information becomes erroneous and therefore unusable.

The object of the present invention is to provide a device for mitigating the above-mentioned drawbacks.

SUMMARY OF THE INVENTION

More precisely, the present invention provides a pulse train relay for relaying pulses of duration not exceeding a maximum value, wherein the relay comprises a receiver having an input suitable for picking up said pulses of a train, and an output suitable for delivering a signal as a function of each picked-up pulse, a transmitter having a transmission-feeding first input, a transmission-controlling second input, and a transmission output, first means for connecting the output of said receiver to the transmission-feeding input of said transmitter, and second means suitable for delivering a control pulse starting on reception of a pulse by said receiver and continuing for a duration which is not less than the maximum duration of said pulses in said train, said second means connecting the output of said receiver to the transmission-controlling input of said transmitter.

BRIEF DESCRIPTION OF THE DRAWINGS

An embodiment of the invention is described by way of example with reference to the accompanying drawings, in which.

MORE DETAILED DESCRIPTION

Figure 1:
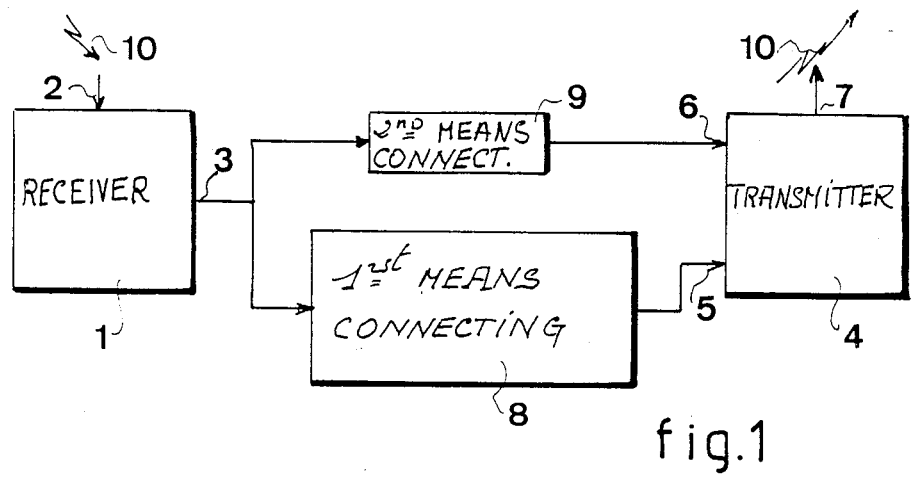
FIG. 1 is a block diagram of a relay in accordance with the invention.

Returning more particularly to FIG. 1, this is a block diagram showing a pulse train relay in which the duration of each pulse does not exceed a maximum value, the relay comprising a receiver 1 having an input 2 suitable for picking up pulses in a train, and an outlet 3 for suitable for delivering a signal as a function of each pulse picked up; a transmitter 4 having a transmission-feeding first input 5, a transmission-controlling second input 6, and a transmission output 7; first means 8 for connecting the output 3 of the receiver to the transmission-feeding first input 5 of the transmitter 4; and second means 9 suitable for delivering a control signal starting substantially on reception of a leading edge and whose duration is not less than the maximum duration of the pulses in the train, said second means 9 connecting the output 3 of the receiver to the transmission-controlling input 6 of the transmitter 4.

In this embodiment, the transmitter 4 and the receiver 1 are intended for receiving and transmitting by means of radio waves 10. As a result they are tuned in conventional manner on a common carrier frequency both for demodulating reception and for modulating transmission.

Naturally, the most advantageous application of such a device is for transmission by means of radio waves, however such transmission could also be performed by cable or by any other transmission means.

Figure 2:
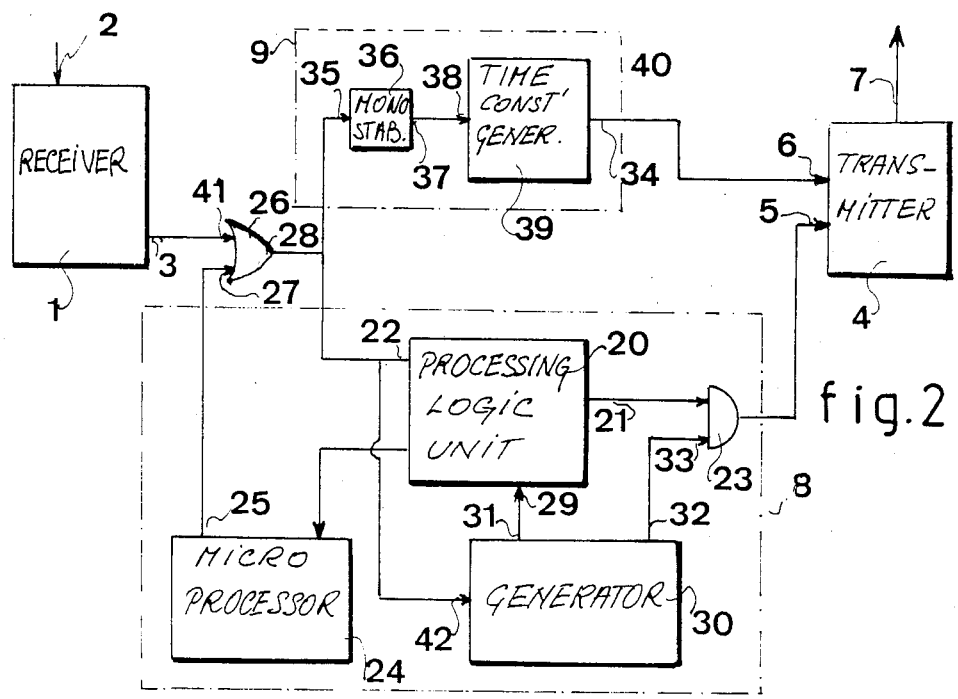
FIG. 2 is a more detailed diagram in accordance with the outline shown in FIG. 1.

FIG. 2 is a more detailed diagram of the relay outlined in FIG. 1. As a result the same reference numerals designate the same items, while other references designate the component parts of the first means 8 and of the second means 9.

The first means 8 may be constituted, for example, by a processing logic unit 20 for generating pulse trains in conformity with the trains that are to be relayed from one relay to another. Thus, said processing logic unit 20 includes an output 21 on which it delivers a pulse train which has been subjected to processing as a function of various preestablished or preprogrammed parameters applied, for example, to its control input 22. The output 21 is connected, e.g. via an AND gate 23, to the transmission-feeding input 5 of the transmitter 4.

The means for controlling the processing in the logic unit may be constituted by a microprocessor 24 having an output 25 connected to the control input 22 of the logic unit 20, e.g. via an OR gate 26 having one input 27 connected to the output 25 of the microprocessor 24 and having its output 28 connected to the control input 22 of the logic unit. The other input 41 of the OR gate 26 is connected to the output 3 of the receiver 1.

A logic unit such as the logic unit 20 generally includes a synchronizing input 29 receiving pulses generated, for example, by a generator 30 suitable for delivering a reference pulse train at an output 31, with the reference train being delivered under the control of a "start" pulse which is generally initially picked up by the receiver 1 whose output 3 is connected via the OR gate 26 to a control input 42 of the generator 30. The generator 30 may also generate locally-generated information pulses which are delivered via a second output 32 for application to the second input 33 of the above-described AND gate 23.

The second means 9 have an output 34 on which a control signal of duration not less than the maximum duration of pulses in the train are delivered starting substantially from the instant at which a pulse is received by the receiver 1. These second means 9 may comprise, for example, going from the input 35: a monostable 36 for delivering a signal at its output 37 as soon as its input 35 receives the leading edge of a signal whose value and rate of change are substantially square in shape giving a relatively steep leading edge. Thus, the monostable circuit delivers a pulse of relatively short duration at its output 37, which pulse is applied to an input 38 of a time constant generator 39 suitable for delivering a signal on its output 40 for a duration which is not less than, and may be slightly greater than, the maximum duration of pulses in the train to be relayed, relay-to-relay, by such a relay. The output 40 of this time constant generator is connected to the transmission-control input 6 of the transmitter 4.

In the embodiment described above, the components of the functional circuit have been deliberately separated so as to show up the nature of the present invention clearly. However, some of the components could nevertheless be used in their primary or secondary functions to feed a plurality of components in order to minimize the number of components used in implementing such circuits, with such procedures being well known in the field of electronics.

The processing logic unit 20 is not described in detail herein since it is known per se. U.S. Pat. No. 4,455,650 mentioned in the background discussion of the present application describes one possible implementation thereof, although other implementations are also known which could be used in the context of the present invention. On the basis of the items described in the present application, the person skilled in the art will have no difficulty in implementing such a logic unit as a function of the requirements and results to be obtained when relaying pulse trains from relay-to-relay.

Figure 3:
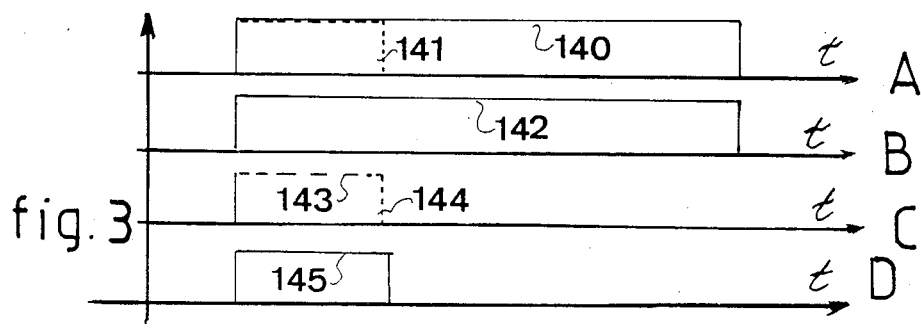
FIG. 3 is a set of waveform diagrams for showing the advantage of such a relay compared with prior art relays.

The general operation whereby pulse trains are relayed, in particular pulse trains constituting data bits, is not described in detail herein since its primary function is identical to that of the prior art relay recalled in the preamble. However, the advantages of a relay in accordance with the invention are explained below, with reference more particularly to the waveform diagrams of FIG. 3.

Assume, by way of example, that the receiver receives a interference pulse whose duration is greater than the maximum possible duration of the pulses in a train to be relayed using a relay of the type described above. This interference pulse is represented at 140 in curve A of FIG. 3, in comparison with the maximum duration 141 of a pulse in a train to be relayed. The pulse 140 is received by the receiver and the output 3 of the receiver delivers a pulse 142 of the same duration, as shown by curve B of FIG. 3.

This pulse 142 delivered by the receiver 1 is applied simultaneously to both the first means 8 and the second means 9 (see FIGS. 1 and 2). It may also be processed by the first means 8 if it corresponds to data confirmed by the program run on the microprocessor 24. However, the second means 9 deliver an instruction signal 143 on output 34 (see FIG. 2) whose duration is only slightly greater than the maximum possible duration 141 of a pulse in a train to be relayed, see curve C in FIG. 3.

This signal 143 is applied to the transmission control input 6 of the transmitter 4, and after it has expired, it prevents the transmitter from transmitting the pulse any longer, given that the transmitter is inhibited as soon as it receives the trailing edge 144 of the transmission control pulse. Under such circumstances, the transmitter may possibly transmit a single pulse 145. This pulse may be filtered or eliminated, either in other relays within the system as a whole, or else, in the end, in the central unit which collects all of the information conveyed by the various relays.

I claim:

1. A pulse train relay for relaying pulses of duration not exceeding a maximum value, wherein the relay comprises a receiver having an input suitable for picking up said pulses of a train, and an output suitable for delivering a signal as a function of each picked-up pulse, a transmitter having a transmission-feeding first input, a transmission-controlling second input, and a transmission output, first means for connecting the output of said receiver to the transmission-feeding input of said transmitter, and second means suitable for delivering a constant duration control pulse starting on reception of a pulse by said receiver and continuing for a duration which is independent of the duration of the received pulse and which is not less than the maximum duration of said pulses in said train, said second means connecting the output of said receiver to the transmission-controlling input of said transmitter, whereby an interference pulse of duration longer than said maximum duration will not be retransmitted by said pulse train relay.

2. A relay according to claim 1, wherein said receiver and transmitter are of the radio wave type and are both tuned to the same carrier frequency.

3. A relay according to claim 1, wherein the first means for connecting the output of said receiver to the transmission-feeding input of said transmitter comprise a processing logic unit, which processing logic unit includes an output suitable for delivering a processed pulse train as a function of data parameters applied to a control input thereto, with said output of said processing logic unit being connected via a first logic gate to the transmission-feeding input of the transmitter.

4. A relay according to claim 3, wherein said processing logic unit includes a microprocessor having an output connected to the feed input of the logic unit via a second logic gate having one input connected to said output of the microprocessor, and having its output connected to the control input of the logic unit.

5. A relay according to claim 4, wherein said logic unit includes a synchronizing input receiving pulses generated by a generator suitable for delivering a reference pulse train.

6. A relay according to claim 1, wherein the second means suitable for delivering a control signal starting on reception of a pulse by said receiver and continuing for a duration which is not less than the maximum duration of said pulses of said train comprises a monostable shaping circuit and a signal generator having a time constant which is not less than the maximum duration of pulses in the train to be relayed.

* * * * *